United States Patent [19]

Saito et al.

[11] Patent Number: 5,190,627

[45] Date of Patent: Mar. 2, 1993

[54] PROCESS FOR REMOVING DISSOLVED OXYGEN FROM WATER AND SYSTEM THEREFOR

[75] Inventors: Takayuki Saito, Hiratsuka; Hidenobu Arimitsu, Atsugi; Ken Nakajima, Kamakura; Yoko Iwase; Hiroyuki Shima, both of Fujisawa, all of Japan

[73] Assignees: Ebara Corporation, Tokyo; Ebara Research Co., Ltd., Fujisawa, both of Japan

[21] Appl. No.: 873,680

[22] Filed: Apr. 24, 1992

Related U.S. Application Data

[63] Continuation of Ser. No. 605,278, Oct. 30, 1990, abandoned.

[30] Foreign Application Priority Data

| Nov. 7, 1989 | [JP] | Japan | 1-287860 |
| Mar. 15, 1990 | [JP] | Japan | 2-62496 |
| Mar. 15, 1990 | [JP] | Japan | 2-62497 |
| Oct. 12, 1990 | [JP] | Japan | 2-274766 |

[51] Int. Cl.⁵ .................. C01B 13/16; C02F 1/46
[52] U.S. Cl. .................. 204/158.2; 204/149; 204/151; 210/748; 210/757
[58] Field of Search .......... 204/158.2, 149, 151, 204/152; 210/748, 757

[56] References Cited

U.S. PATENT DOCUMENTS

| 3,673,086 | 6/1972 | Drobnik | 210/757 |
| 4,159,309 | 6/1979 | Faul | 423/53 |
| 4,527,626 | 7/1985 | Cantu et al. | 204/128 |
| 4,557,835 | 12/1985 | Lorentz | 210/748 |
| 4,574,071 | 3/1986 | de Silva et al. | 422/14 |
| 4,627,921 | 12/1986 | Meyers | 210/668 |
| 4,749,640 | 6/1988 | Tremont et al. | 430/314 |
| 4,836,929 | 6/1989 | Baumann et al. | 210/638 |
| 4,883,594 | 11/1989 | Sekoulov et al. | 210/603 |

FOREIGN PATENT DOCUMENTS

| 281940 | 9/1988 | European Pat. Off. |
| 373268 | 6/1990 | European Pat. Off. |
| 427191 | 5/1991 | European Pat. Off. |
| 2418007 | 2/1979 | France |
| 0108654 | 9/1978 | Japan | 210/748 |
| 29494 | 1/1990 | Japan |
| 2014868 | 9/1979 | United Kingdom |

OTHER PUBLICATIONS

Kagaku Dojin; Apr. 30, 1970; pp. 226-227; "Study of Chemical Reaction by Rate Theory-In comparison to its Study by Mechanism Theory—"; by Tsutomu Kagitani, Kyoto University.

Ohm Company; Jan. 30, 1975; "Practical Treatment of Boiler Water"; by Jun Sakamoto.

*Primary Examiner*—John Niebling
*Assistant Examiner*—Brian M. Bolam
*Attorney, Agent, or Firm*—Oblon, Spivak, McClelland, Maier & Neustadt

[57] ABSTRACT

Ultrapure water is formed by a process employing a simple system for safely and easily removing oxygen from water containing dissolved oxygen; which process comprises dissolving a reducing agent in water containing dissolved oxygen and irradiating the resulting water with ultraviolet rays. The ultrapure water is particularly utilized as a rinsing water in the electronics industry.

5 Claims, 5 Drawing Sheets

PROCESS FOR REMOVING DISSOLVED OXYGEN FROM WATER AND SYSTEM THEREFOR

This application is a continuation of application Ser. No. 07/605,278, filed on Oct. 30, 1990, now abandoned.

BACKGROUND OF THE INVENTION

1. Field of the Invention:

The present invention relates to a process for removing dissolved oxygen (hereinafter referred to as DO) from water and particularly to a process for removing DO present in a low concentration (1 mg/l or less) from water and a system therefor.

The present invention can be utilized for rinsing water used in the electronics industry, feedwater for boilers, water used in various steps of the food industry, cleaning water, etc.

2. Prior Art:

The conventional processes for removing DO from water include physical processes (e.g., thermal degassing, vacuum degassing, purging with $N_2$ gas) and chemical processes involving the addition of a reducing agent.

The process of thermal degassing comprises contacting a gas-containing water directly with steam to heat the water and thereby reducing the water solubility of the gas to remove DO from the water. This process is employed mainly at power plants requiring a large amount of water, in order to remove DO from feedwater for boilers to prevent the corrosion of boilers, etc.

The process by vacuum degassing is used mainly for degassing of cooling water. The vacuum degassing tower used in the process is packed with Raschig rings, etc.; in this tower, water is sprayed at the top to increase the surface area of the water present in the tower and further a vacuum is created inside the tower, whereby the gas dissolved in water is discharged out of the tower. A membrane degassing process which effects vacuum degassing via a hydrophobic membrane has recently attracted attention. In this process, since the liquid phase and the gas phase (vacuum) are separated by the membrane. The tower height is not subject to any restriction, unlike in the case of the vacuum degassing tower.

There is also a process comprising blowing $N_2$ gas into water to increase the partial pressure of $N_2$ gas in the water and thereby decrease the partial pressure of $O_2$ gas in the water, to remove $O_2$ gas from the water.

The above are physical processes for removing DO from water. Besides these, there are chemical processes utilizing a chemical reaction. For example, a reducing agent such as hydrazine ($N_2H_4$), sodium sulfite ($Na_2SO_3$) or the like is added to water to effect the following chemical reaction, whereby the DO in the water can be removed.

In recent years, with the adoption of a higher density in semiconductor integrated circuits, the quality requirements for the ultrapure water used therefor have become increasingly higher. For example, as shown in Table 1, such water is required to contain electrolytes, fine particles, living microbes, etc. in extremely low concentrations, and DO in a concentration of 50 μg/l or less.

TABLE 1

| | Quality of Ultrapure Water and Integration of LSI Circuit | | |
|---|---|---|---|
| | Integration | | |
| Item | 1M | 4M | 16M |
| Resistivity (MΩ-cm at 25° C.) | >17.5 | >18.0 | >18.0 |
| Fine particles (counts/ml) | | | |
| 0.1 μm | <20 | | |
| 0.08 μm | | <10 | |
| 0.05 μm | | | <10 |
| Living microbes (counts/100 ml) | <10 | <5 | <1 |
| TOC (μg C/l) | <50 | <30 | <10 |
| Silica (μg $SiO_2$/l) | <10 | <3 | <1 |
| DO (μg O/l) | <100 | <50 | <50 |

Achieving an extremely low concentration of DO with the conventional thermal degassing or vacuum degassing process alone is difficult not only from the principle of the process but also in view of the facility scale or treatment time required for the process. Therefore, in the case of, for example, feedwater for percolation type boilers, etc., a chemical process of injecting hydrazine ($N_2H_4$) is used in combination with the above physical process, in order to reduce the DO in the feedwater to 100 μg/l or less.

In removing DO by a chemical process, however, there remains the chemical reagent (e.g., $N_2H_4$, $Na_2SO_3$) added in excess relative to the amount of DO; the residual chemical reagent becomes a load to an ion exchange resin used in the ion exchange treatment, and moreover the $SO_4^{2-}$ ion, etc. formed by the reaction of the chemical reagent with DO becomes a load to the ion exchange resin as well.

Further, the purging process by $N_2$ requires the use of a large amount of $N_2$ gas (1-2 $Nm^3/m^3$), which is uneconomical.

As described above, in achieving an extremely low concentration of DO by conventional degassing processes, there have been problems; for example, a large facility is required, there occurs an increase in impurity ions, and a large amount of a chemical reagent or $N_2$ gas is required.

SUMMARY OF THE INVENTION

It is therefore an object of the present invention to provide a process for DO removal in only a small amount of energy which can obtain water containing a very low concentration of DO i.e. high purity water, inexpensively and stably and a simple system therefor.

Other objects and advantages of the present invention will become apparent to those skilled in the art from the following description and drawings.

DETAILED DESCRIPTION OF THE PREFERRED EMBODIMENTS

The present invention firstly provides a process for removing oxygen from water containing DO, which process comprises dissolving a reducing agent in water containing DO and irradiating the resulting water with ultraviolet rays. The process preferably comprises the following specific conditions.

(1) As the reducing agent, there is used at least one reducing agent selected from hydrogen, hydrazine, oxalic acid, formic acid, sodium sulfite and sodium hydrogensulfite. The reducing agent is dissolved in water containing DO, in such an amount that the molar ratio of the reducing agent added to DO in water becomes 1-5.

(2) The hydrogen gas employed as a reducing agent is dissolved in a water containing DO, via a gas-permeable membrane.

(3) The hydrogen employed as a reducing agent is obtained by electrolysis of water.

(4) Hydrogen gas is dissolved in water to be treated; the resulting water is irradiated with ultraviolet rays to remove the DO from the water; then, unreacted dissolved hydrogen present in the water is removed via a gas-permeable membrane (under vacuum condition).

(5) A reducing agent selected from reducing agents other than hydrogen is dissolved in water to be treated, via a membrane filter; the resulting water is irradiated with ultraviolet rays; then, the residual reducing agent is removed by means of a mixed bed type ion exchange resin.

(6) The amount of ultraviolet rays applied is at least 10 mW·sec/cm$^2$.

The present invention secondly provides an apparatus for removing oxygen from water containing DO, which comprises:

(a) a hydrogen generator of water electrolysis type, (b) a unit for dissolving the hydrogen generated in the hydrogen generator (a), in water containing DO, to be treated, via a gas-permeable membrane, (c) a unit for irradiating the water obtained in the unit (b), with ultraviolet rays, (d) if necessary, a unit for removing unreacted residual hydrogen, if present, via a gas-permeable membrane, and (e) connecting means such as pipes, pumps and the like, for connecting the units (a) to (c) or (a) to (d).

The dissolution of H$_2$ gas in the water can be effected, for example, by a H$_2$ gas-dissolving unit accommodating a H$_2$ gas-diffusing pipe or a H$_2$ gas-diffusing nozzle, or by a H$_2$ gas-dissolving means (e.g., H$_2$ gas-diffusing nozzle) provided at the bottom of an ultraviolet irradiation unit comprising an ultraviolet lamp and a protective quartz tube. Dissolution of H$_2$ gas through a gas-permeable membrane is effective for the production of ultrapure water, etc. because the fine particles present in the H$_2$ gas can be filtered by the membrane.

The ultraviolet lamp used can be any light source which generates ultraviolet rays having a wavelength of 400 nm or less. As the light source, there is generally used a mercury lamp. Besides the mercury lamp, there can be used, as the light source, a xenon mercury lamp, a xenon lamp, an excimer laser, an electron synchrotron, etc.

Next, description is made of the relationship between the amount of reducing agent added and the DO contained in the treated water.

For use as a raw water, pure water was obtained by treating tap water in a mixed bed type ion exchange resin tower. This raw water contained DO in an amount of about 7.3 mg/l. H$_2$ gas was added to the raw water via a gas-permeable membrane, and the resulting water was introduce into an ultraviolet irradiation unit at a rate of 200 l/hr. The amount of H$_2$ gas added was controlled so that the molar ratio of H$_2$ added/DO in the raw water became 1-5. The amount of ultraviolet rays applied was 160 mW·sec/cm$^2$.

Figure 2:
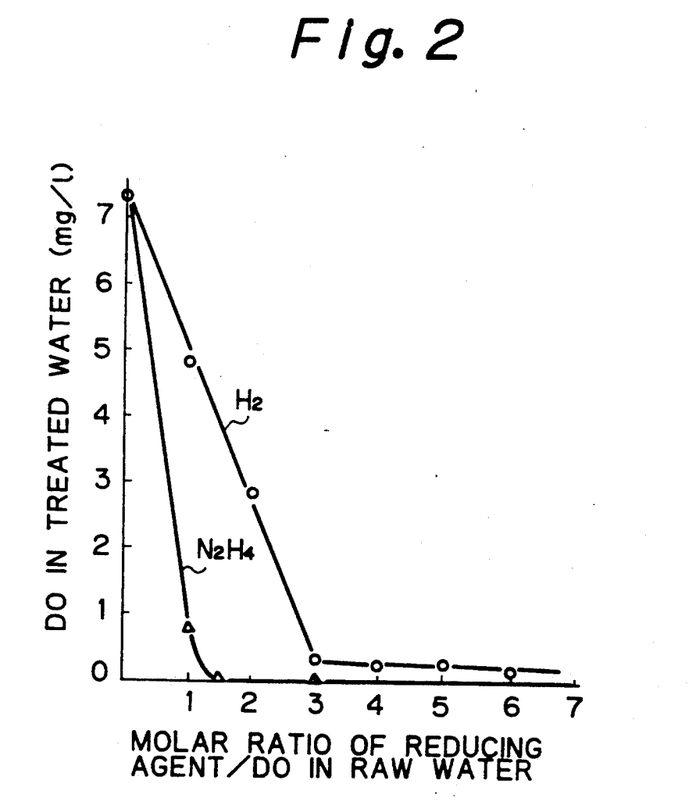
FIG. 2 shows the relationship between the molar ratio of a reducing agent/DO in raw water and the DO in treated water.

The relationship between the molar ratio of H$_2$ gas added/DO in raw water and the DO in treated water is shown in FIG. 2. As is clear from FIG. 2, when the molar ratio of H$_2$ gas/DO in raw water is 3, the DO in treated water has reached substantially an equilibrium. Accordingly, in practical application, a level of 5 or less suffices for the molar ratio of H$_2$ gas/DO in raw water.

Similarly, a N$_2$H$_4$ solution was injected into the raw water by a pump, via membrane filter of 0.45 μm, and the resulting water was introduced into an ultraviolet irradiation unit at a rate of 200 l/hr. The amount of N$_2$H$_4$ added was controlled so that the molar ratio of N$_2$H$_4$ added/dissolved water in the raw water become 1-3.

The results are shown in FIG. 2. When the molar ratio of N$_2$H$_4$/DO in raw water is 1.5, the dissolved water in treated water has substantially reached an equilibrium.

When there were used other reducing agents, i.e. oxalic acid, sodium sulfite, sodium hydrogensulfite and formic acid, the results obtained were the same as those when H$_2$ gas or N$_2$H$_4$ was used in FIG. 2.

Based on the above results, the molar ratio of reducting agent/DO in raw water should be 1-5.

Next, description is made of the relationship between the level of ultraviolet radiation applied and the dissolved oxygen in treated water.

For use as a raw water, pure water was obtained by treating tap water in a mixed bed type ion exchange resin tower. The raw water contained DO in an amount of about 7.3 mg/l. H$_2$ gas was added to the raw water via a gas-permeable membrane at a molar ratio (of H$_2$ gas added/dissolved oxygen in raw water) of 3, and the resulting water was introduced into an ultraviolet irradiation unit at a rate of 50 l/hr–150 l/hr.

Figure 3:
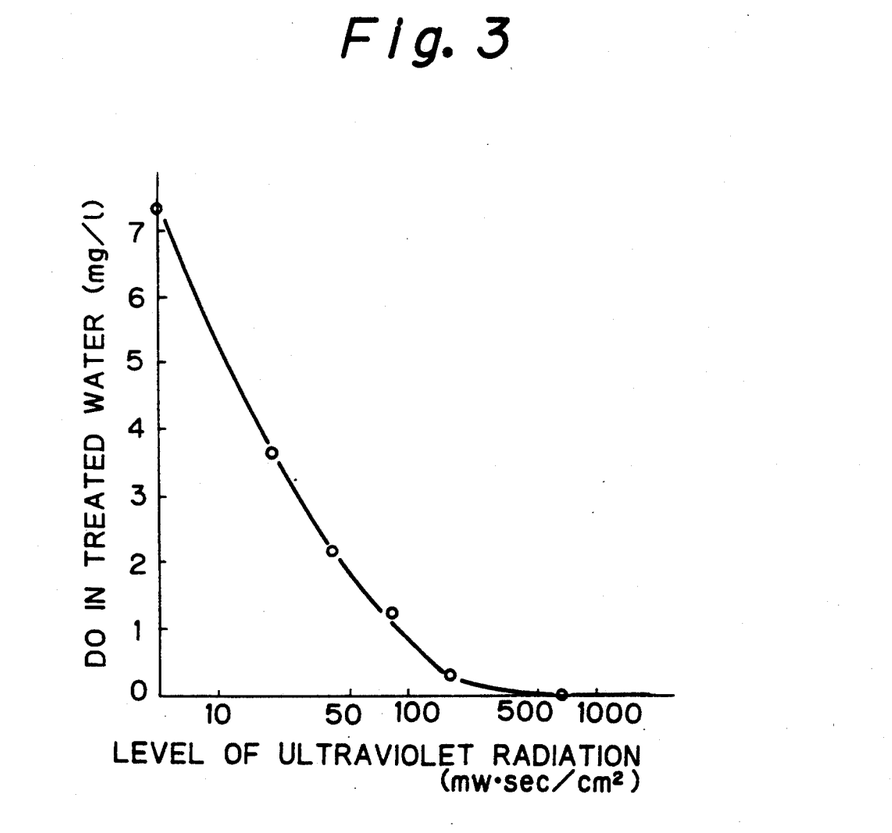
FIG. 3 shows the relationship between the level of ultraviolet radiation applied and the amount of DO present in treated water.

The level of ultraviolet radiation applied was 640–21 mW·sec/cm$^2$ at 254 nm measured with the UV illumination intensity meter CM2503 manufactured by IWASAKI ELECTRIC CO., LTD. The relationship between the level of ultraviolet radiation applied and the DO in treated water is shown in FIG. 3. As is clear from FIG. 3, the level of ultraviolet radiation applied must be at least 10 mW·sec/cm$^2$. The upper limit of the amount of ultraviolet radiation applied is determined in view of the level of oxygen permitted to remain in the treated water and the economy of the oxygen removal system.

As far as our search is concerned, there could be found no paper discussing a phenomenon that when $H_2$ gas is dissolved in a water containing DO and the resulting water is irradiated with ultraviolet rays, the DO content in water is reduced.

Although the details of the reaction taking place in the process of the present invention have not yet been clarified and confirmed, it is presumed that the following reactions take place in the present process.

When a photon collides with a gas atom, the atom is ionized via an excited state. Between the ground state and the ionized state, there exist numerous excited states. The resonance and excitation potential is 11.2 V in the case of $H_2$ and 5 V in the case of $O_2$. The minimum excitation potential can be smaller than the above potential.

When irradiated with ultraviolet rays, $O_2$ of low excitation potential is placed in an excited state and it is presumed that the following reactions proceed.

[(O)* represents an oxygen atom in excited state.]

DO reacts with $H_2$ to become water ($H_2O$). This does not cause any increase in impurities. Accordingly, in particular when the present process is applied to the production of ultrapure water, there is obtained a big advantage in that no reduction in water quality occurs.

Needless to say, ultraviolet rays have a sterilizing effect; therefore, the present invention can be utilized not only for the removal of DO but also for the sterilization of water.

It is known that when a water containing DO is mixed with a reducing agent, the DO concentration in water is reduced by the reaction of DO with the reducing agent, but the reaction efficiency is fairly low when the reaction is conducted at ambient temperature.

Ultraviolet rays have an energy of about 300 kJ/mol when the wavelength is 400 nm, about 400 kJ/mol when the wavelength is 300 nm, and about 600 kJ/mol when the wavelength is 200 nm. Meanwhile, the dissolution energies of reducing agents are in the range of about 300–450 kJ/mol as there are shown, for example, the values of hydrazine ($N_2H_4$) and its intermediate reaction products in Table 2. Therefore, the irradiation with ultraviolet rays can impart a sufficient energy to a reducing agent. It is presumed that the $O_2$ in water is also partially excited by the irradiation.

Therefore, by adding a reducing agent and then applying ultraviolet rays, the reaction between DO and the reducing agent is significantly accelerated and DO can be effectively removed.

TABLE 2

| Dissociation Energy | |
|---|---|
| | Dissociation energy (kJ/mol) |
| $H_2N-NH_2$ | 276 |
| $H-NH_2$ | 448 |
| $H-NH$ | 368 |
| $H-N$ | 356 |

In order to achieve the above object, the present invention provides a system for removing DO from water, which system comprises:

a hydrogen generator for generating hydrogen by electrolysis of water;

a unit for dissolving the hydrogen supplied from the hydrogen generator, in an oxygen-containing water to be treated, via a gas-permeable membrane; and a unit for irradiating the hydrogen-dissolved water to be treated, with ultraviolet rays.

The present invention further provides a system for removing DO from water, which is an addition, to the above system, of a unit for removing the unreacted dissolved hydrogen via a gas-permeable membrane.

That is, the present invention provides an improved system for removing DO from water safely and easily, by using the hydrogen generated by electrolysis of water. The improved system of the present invention is characterized by comprising:

(1) a hydrogen generator for generating hydrogen by electrolysis of water;

(2) a hydrogen-dissolving unit for dissolving the hydrogen obtained above, in a DO-containing water to be treated, via a gas-permeable membrane;

(3) a unit for irradiating the resulting water with ultraviolet rays;

(4) a unit for removing excessive hydrogen via a gas-permeable membrane if the unreacted dissolved hydrogen exists; and (5) pipes connecting the units (1) to (3) or (1) to (4), pumps, etc.

The hydrogen generator can be any unit which generates a required amount of hydrogen by electrolysis of water. There can be used, for example, an electrolysis unit using an aqueous alkali solution, an electrolysis unit using an aqueous solid polymer electrolyte solution and an electrolysis unit using an aqueous solid oxide electrolyte solution. The hydrogen generator is preferably an electrolysis unit using an aqueous solid polymer electrolyte solution, which uses no corrosive solution (e.g., alkali solution) and whose maintenance may be easily carried out.

The gas-permeable membrane is a membrane which transmits gases such as hydrogen, oxygen, nitrogen, steam and the like but does not transmit water. There can be used a hydrophobic membrane made of a silicone rubber, a poly(ethylene tetrafluoride), a polyolefin, a polyurethane or the like. The membrane has pores of 20 $\mu$m or less in diameter, and a membrane having pores of 0.01–1 $\mu$m in diameter is widely used.

The hydrogen-dissolving unit is a unit wherein water is passed to one side of the above-mentioned gas-permeable membrane and the other side is pressurized by hydrogen to dissolve hydrogen in the water. This unit can perform dissolution of hydrogen efficiently, as compared with a gas-diffusing nozzle, etc.

The excess hydrogen-removing unit comprises a unit wherein water is passed at one side of the above-mentioned gas-permeable membrane and the other side is made vacuum by a vacuum pump to remove excess hydrogen from the water.

The present system for DO removal works in the following way.

In the hydrogen-dissolving unit, since hydrogen is dissolved in water via a gas-permeable membrane, no bubbles are formed, the amount of introduced hydrogen is equal to the amount of hydrogen dissolved in the water, and the efficiency of hydrogen dissolution in water is substantially 100%. That is, there is no discharge of excessive hydrogen from the hydrogen-dissolving unit and consequently no gas separation tower is required. Further, the amount of hydrogen dissolved can be controlled by, for example, the material and area of the membrane used.

In the hydrogen generator by electrolysis of water, hydrogen can be easily generated by electricity control, in an amount required for dissolution in the hydrogen-dissolving unit. Therefore, hydrogen can be supplied in an amount required for the DO-containing water.

Thus, by combining the hydrogen generator based on the electrolysis of water and the hydrogen-dissolving unit using a gas-permeable membrane, the amount of hydrogen added can be controlled stably, safely and easily.

In the excessive hydrogen-removing unit, the dissolved hydrogen remaining after the ultraviolet irradiation unit can be removed. That is, since hydrogen gas has a very small molecular weight as compared with other gases, it can easily move from a liquid phase to a vacuum side via a gaspermeable membrane and can thereby be removed. Ordinarily, hydrogen has a gas permeation speed of 5-20 times faster than that of oxygen.

EXAMPLES

The present invention is described specifically below with reference to Examples and Comparative Examples. However, the present invention is in no way restricted to the following Examples.

EXAMPLE 1

Figure 4:
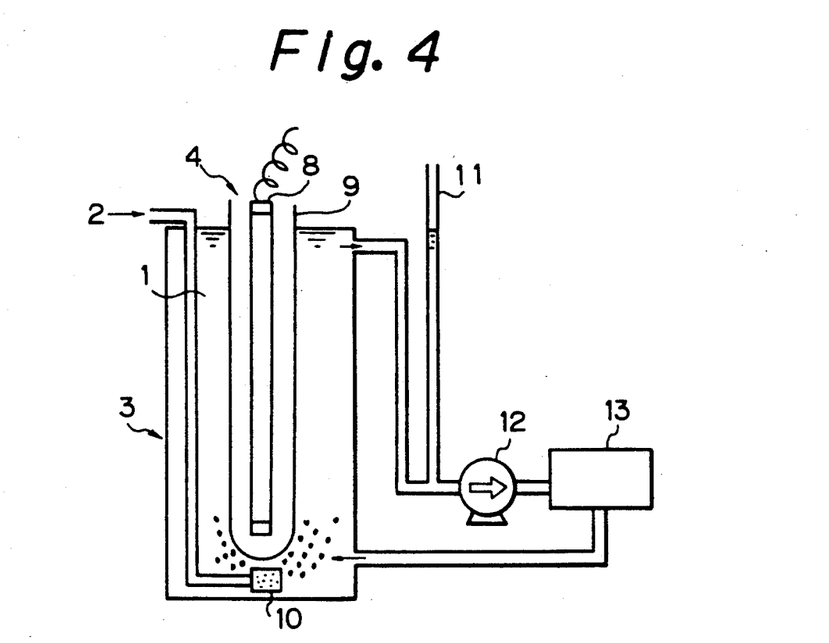
FIG. 4 is a schematic, sectional view of the experimental apparatus of glove tests utilizing hydrogen as a reducing agent to determine relationships between the amount of DO present in treated water and a required treating time in accordance with the present invention.

Tap water was converted to a pure water by being treated in a so-called mixed bed type desalting tower packed with a mixture of a strongly acidic cation exchange resin (Dowex HCR-W2 manufactured by Dow Chemical) and a strongly basic anion exchange resin (Dowex SBR-P manufactured by Dow Chemical). The pure water was used as raw water 1. One liter of the pure water was collected in a container 3 of an apparatus shown in FIG. 4. In FIG. 4, the container 3 has an effective volume of about 1 l. There was lit a low-pressure mercury lamp 8 of 100 W (power consumption) provided at the center of the container 3 via a protective tube 9 made of artificial quartz. $H_2$ gas was blown into the vessel at a rate of 100 N-ml/min through an $H_2$ gas-diffusing nozzle 10 provided below the protective tube. In FIG. 4, 11 refers to a gas-liquid separator; 12 refers to a pump; and 13 refers to a DO meter.

Figure 6:
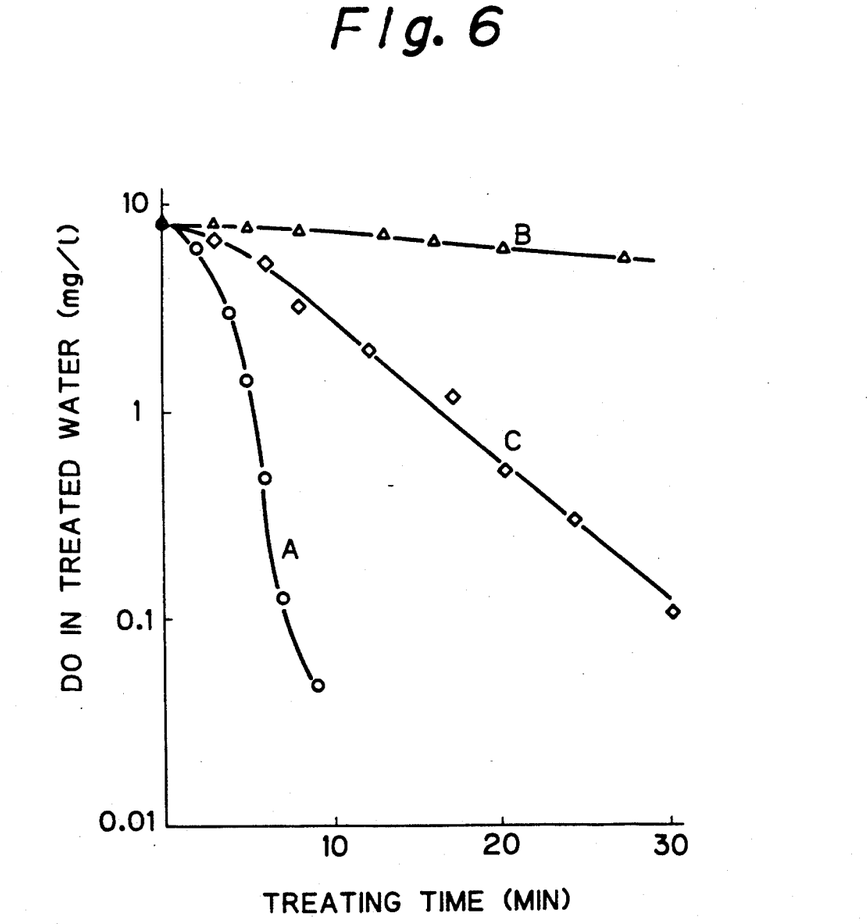
FIG. 6 is a graph showing relationships between the DO in treated water and treating time using the experimental apparatus showing in FIG. 4.

In FIG. 6 are shown relationships between an amount of DO present and a treating time. The result of Example 1 is represented by a curve A, wherein DO was reduced to 50 $\mu$g/l or less in a treating time of about 9 minutes.

COMPARATIVE EXAMPLE 1

One liter of the same pure water was collected in the same manner as in Example 1. The low-pressure mercury lamp was lit without blowing $H_2$ gas. The result is shown by a curve B in FIG. 6, and the reduction in DO was very slight even after a treating time of 30 minutes.

COMPARATIVE EXAMPLE 2

One liter of the same pure water was collected in the same manner as in Example 1. $H_2$ gas was blown at a rate of 100 N-ml/min without lighting the low-pressure mercury lamp. The result is given by a curve C in FIG. 6, and DO was reduced to about 100 $\mu$g/l after a treating time of 30 minutes.

EXAMPLE 2

Tap water was treated by a mixed bed type ion exchange resin tower to obtain a pure water, and the pure water was used as raw water 1. The raw water contained about 8,000 $\mu$g/l of DO. The raw water 1 was introduced into a container 3 of the apparatus shown in FIG. 5, from a raw water pipe 15 provided at the bottom of the container 3, using a raw water pump 7. Into the raw water pipe 15 was injected about 10 mg/l of hydrazine ($N_2H_4$) from a chemical-filling pipe 17 fitted to the raw water pipe 15, using a chemical-injection pump 16. Also, a low-pressure mercury lamp 8 provided at the center of the container 3 via protective tube 9, was lit to irradiate the raw water 1 introduced into the container 3, with ultraviolet rays. The water at the outlet of the container 3 was passed through a mixed bed type ion exchange resin column 18 to remove the residual hydrazine in the water. The thus treated water was measured for DO by a DO meter 13. The DO in the treated water 6 is shown in Table 3. In Example 2, a treated water containing DO in an amount of less than 100 $\mu$g/l could be obtained with a small amount electric power.

EXAMPLE 3

Figure 5:
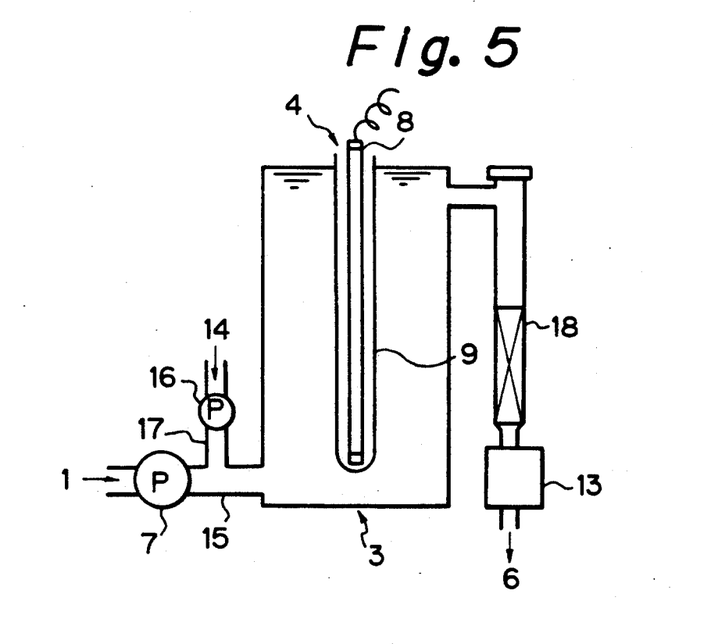
FIG. 5 is a schematic, sectional view of the experimental apparatus utilizing a reducing agent other than hydrogen in accordance with the present invention.

Using the same test apparatus as in example 2, about 60 mg/l of oxalic acid was injected using the chemical-injection pump 16; and also, the low-pressure mercury lamp 8 was lit to effect irradiation with ultraviolet rays. The DO of the treated water obtained is shown in Table 3.

EXAMPLE 4

Using the same test apparatus as in Example 2, about 80 mg/l of sodium sulfite was injected using the chemical-injection pump 16; and also, the low-pressure mercury lamp 8 was lit to effect irradiation with ultraviolet rays. The DO of the treated water obtained is shown in Table 3.

EXAMPLE 5

Using the same test apparatus as in Example 2, about 50 mg/l of formic acid was injected using the chemical-injection pump 16; and also, the low-pressure mercury lamp 8 was lit to effect irradiation with ultraviolet rays. The DO of the treated water obtained is shown in Table 3.

COMPARATIVE EXAMPLE 3

Using the same test apparatus as in Example 2, the same pure water was contacted with hydrazine without lighting the low-pressure mercury lamp 8. The DO of the treated water obtained is shown in Table 3. In Comparative Example 3, the decrease in DO was slight.

COMPARATIVE EXAMPLE 4

Using the same test apparatus as in Example 3, the same pure water was contacted with oxalic acid without lighting the low-pressure mercury lamp 8. The DO of the treated water obtained is shown in Table 3. In Comparative Example 4, the decrease in DO was slight.

COMPARATIVE EXAMPLE 5

Using the same test apparatus as in Example 4, the same pure water was contacted with sodium sulfite without lighting the low-pressure mercury lamp 8. The DO of the treated water obtained is shown in Table 3. In Comparative Example 5, the decrease in DO was small as compared with Example 4.

COMPARATIVE EXAMPLE 6

Using the same test apparatus as in Example 5, the same pure water was contacted with formic acid without lighting the low-pressure mercury lamp 8. The DO of the treated water obtained is shown in Table 3. In Comparative Example 6, the decrease in DO was slight.

COMPARATIVE EXAMPLE 7

Using the same test apparatus as in Example 2, the same pure water was passed without injecting any reducing agent but with lighting the low-pressure mercury lamp 8. In Comparative Example 7, there was substantially no decrease in DO, as shown in Table 3.

TABLE 3

| | DO Levels of Treated Waters | |
|---|---|---|
| | Conditions | DO ($\mu g/l$) |
| Example 2 | Hydrazine addition and UV rays irradiation | 70–90 |
| Example 3 | Oxalic acid addition and UV rays irradiation | 100–120 |
| Example 4 | Sodium sulfite addition and UV rays irradiation | 75–100 |
| Example 5 | Formic acid addition and UV rays irradiation | 100–130 |
| Comparative Example 3 | Only hydrazine addition | 6500–7500 |
| Comparative Example 4 | Only oxalic acid addition | 7000–8000 |
| Comparative Example 5 | Only sodium sulfite addition | 1000–2000 |
| Comparative Example 6 | Only formic acid solution | 7500–8000 |
| Comparative Example 7 | Only UV rays irradiation | 7500–8000 |

EXAMPLE 6

Figure 1:
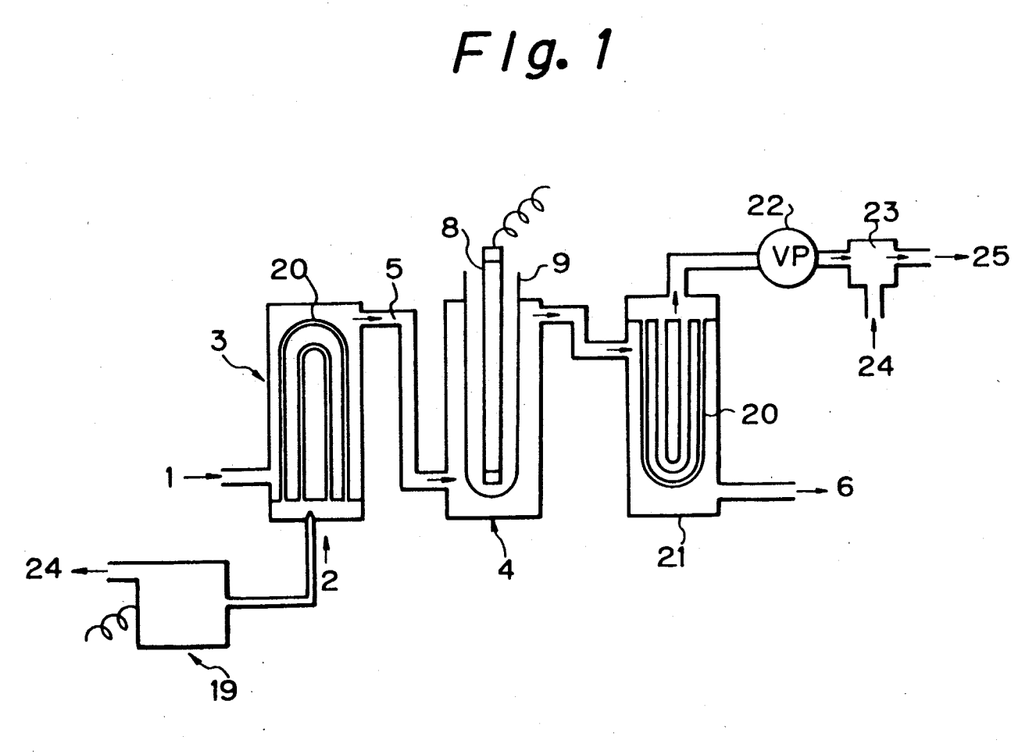
FIG. 1 is a schematic sectional view of an example of the system of the present invention.

In FIG. 1, a hydrogen generator 19 is unit by electrolysis of water using an aqueous solid polymer electrolyte. It can electrically control the amount of hydrogen generated and can easily generate a required amount of hydrogen.

Then, the hydrogen 2 generated in the hydrogen generator 19 is fed to a hydrogen-dissolving container 3 to dissolve the hydrogen in raw water 1 containing DO, via a membrane 20. For example, when there is treated a raw water containing DO in an amount of about 1 mg/l and having a flow rate of 150 l/hr, a required amount of hydrogen is fed by generating hydrogen in an amount of 8 ml/min and using, as a gas-permeable membrane 20, a hollow polyurethane membrane having a membrane area of 0.4 m². In this case, hydrogen is dissolved in a slight excess relatively equivalent to the amount of oxygen.

Next, the hydrogen-dissolved staring water 5 is introduced into an ultraviolet irradiation unit 4 to react hydrogen with DO to remove DO.

Thereafter, the DO-removed water is introduced into an excessive hydrogen-removing unit 21, where the dissolved hydrogen remaining in the water owing to the addition in slight excess equivalent is removed by a vacuum pump 22 via a gas-permeable membrane 20 to obtain treated water free from DO.

The waste gas 25 containing hydrogen, discharged from the vacuum pump 22 is very small in volume, but is mixed with a gas 24 composed mainly of the oxygen produced by the hydrogen generator, on an oxidation catalyst 23 and treated.

What is claimed is:

1. A process for removing dissolved oxygen from water, comprising irradiating with a total dose of ultraviolet radiation of more than about 10 mW.sec/cm², a solution consisting essentially of water, dissolved oxygen, and added hydrogen in an amount of about 1–5 mole of hydrogen per mole of dissolved oxygen.

2. A process according to claim 1 wherein hydrogen is dissolved in said oxygen-containing water to be treated via a gas-permeable membrane.

3. A process according to claim 1 wherein said hydrogen is generated from a hydrogen generator by electrolysis of water.

4. A process according to claim 2 wherein said hydrogen is generated from a hydrogen generator by electrolysis of water.

5. A process according to any one of claims 2–4, or wherein after adding hydrogen to water containing dissolved oxygen and irradiating the resulting water with ultraviolet rays to remove dissolved oxygen from the water, the unreacted dissolved hydrogen is removed from the water via a gas-permeable membrane.

* * * * *